April 26, 1927.
M. O. REEVES
1,626,299
CONTROLLER FOR VARIABLE SPEED TRANSMISSION
Filed May 19, 1925   2 Sheets-Sheet 1
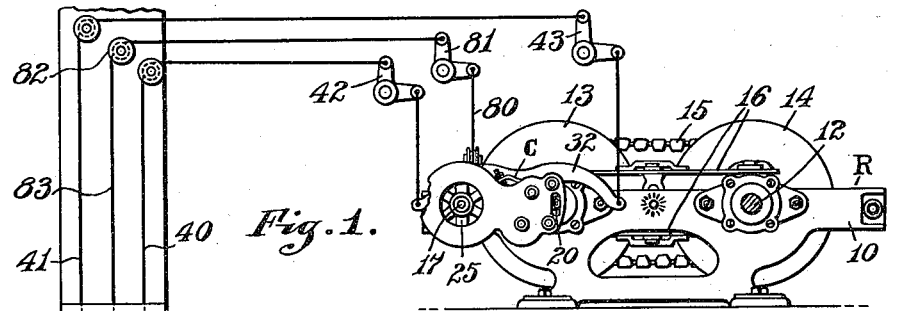
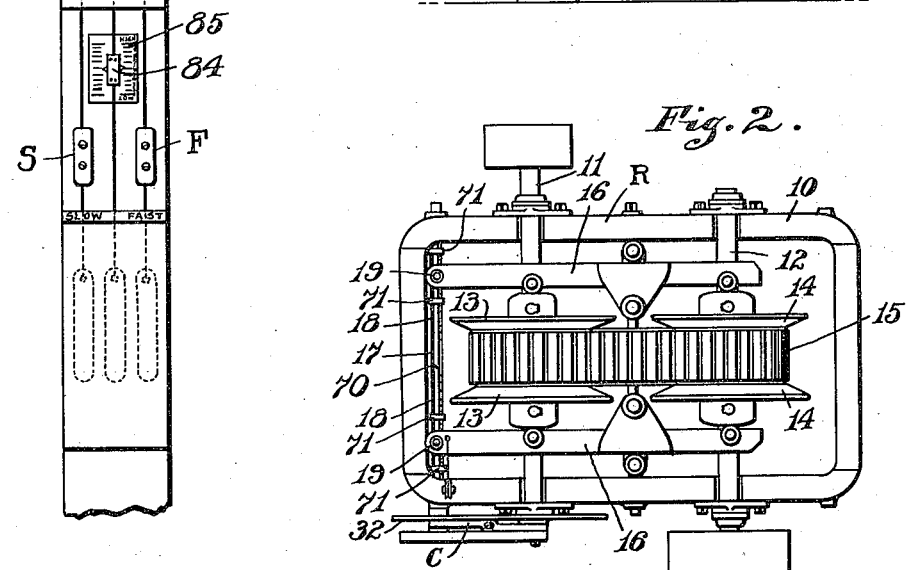
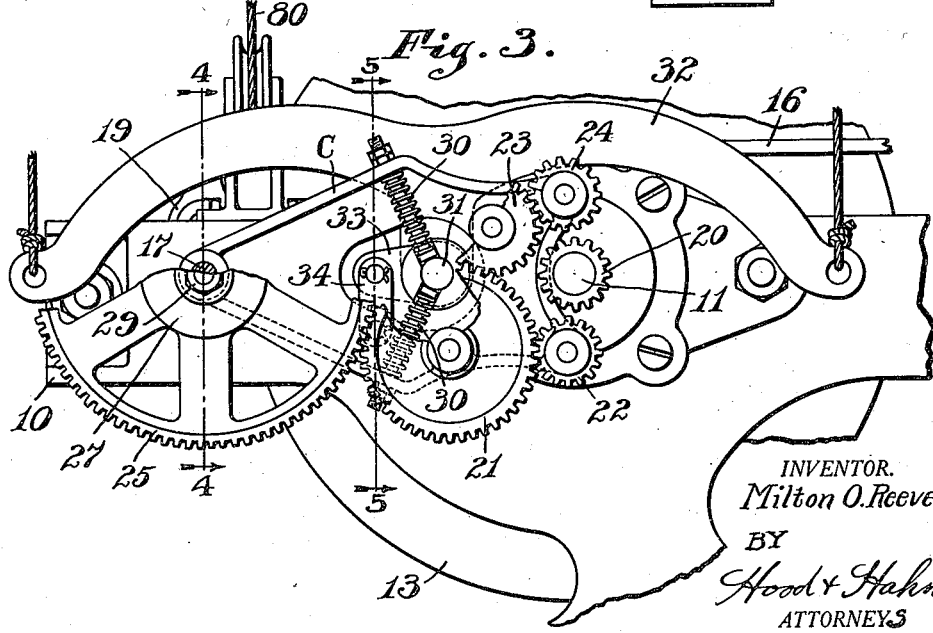
INVENTOR.
Milton O. Reeves,
BY
Hood & Hahn.
ATTORNEYS April 26, 1927.
M. O. REEVES
1,626,299
CONTROLLER FOR VARIABLE SPEED TRANSMISSION
Filed May 19, 1925 2 Sheets-Sheet 2
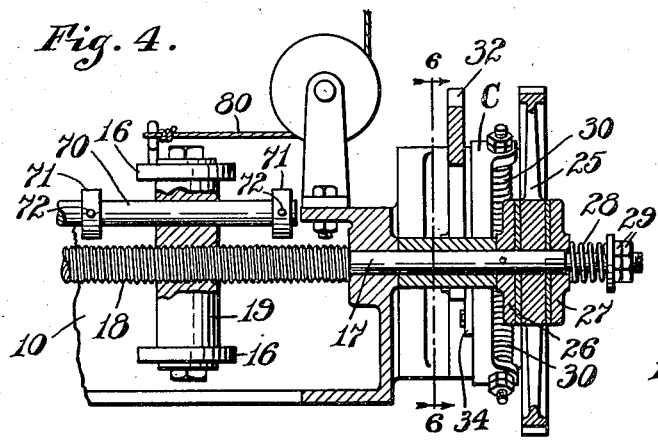
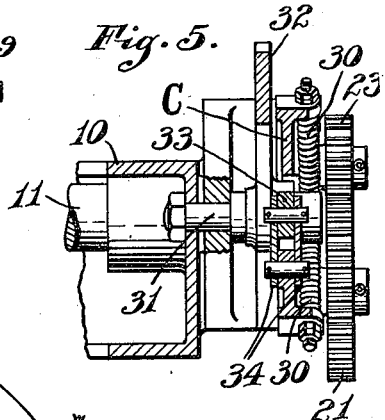
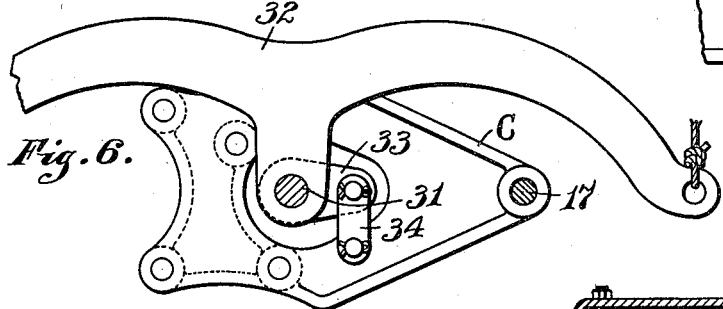
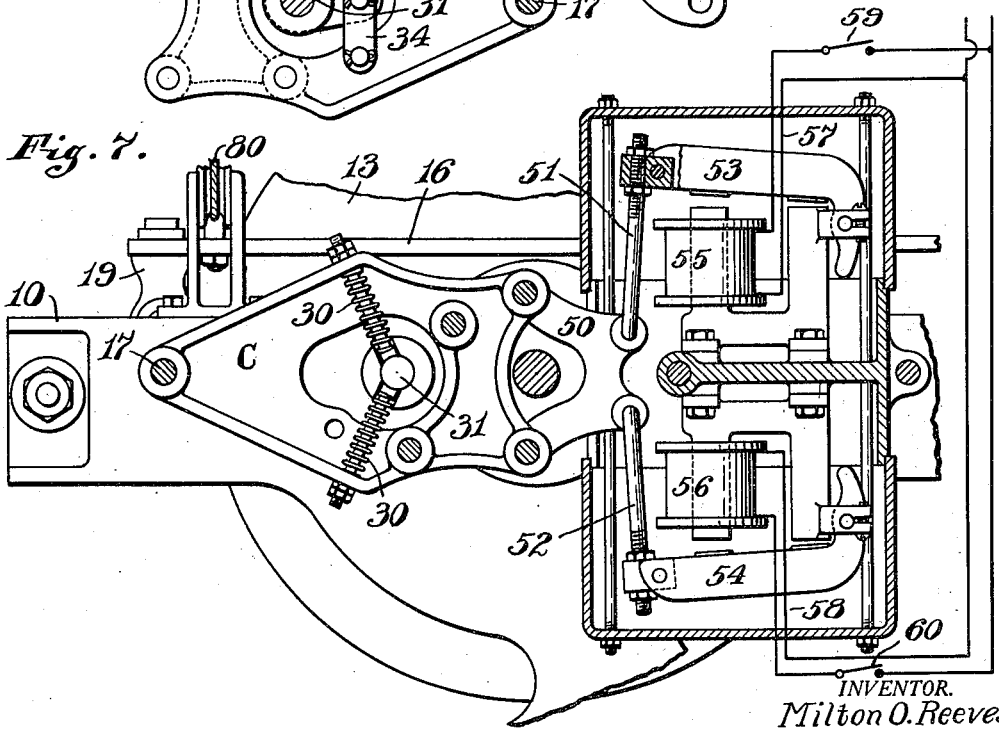
INVENTOR.
Milton O. Reeves
BY
Hood & Hahn.
ATTORNEYS Patented Apr. 26, 1927.

1,626,299

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION OF INDIANA.

CONTROLLER FOR VARIABLE-SPEED TRANSMISSION.

Application filed May 19, 1925. Serial No. 31,449.

Many machines require, for their most efficient operation, driving at particular speeds depending upon the character of work which, at the time, is to be performed by such machine and the variable speed of drive is, in many instances, derived through a "Reeves" variable speed transmission, which is characterized by two pairs of laterally adjustable cones connected by a belt, the cone pairs being simultaneously oppositely laterally adjusted by means of a pair of abutment levers.

Such a variable speed transmission is ordinarily located at a point beyond immediate reach of the operator of the machine and, in many instances, it is desirable to be able to change the adjustment of the speed varying transmission from one or more points distant, not only from the transmission, but also distant from the machine driven thereby.

The object of my present invention is to provide means for distant control of adjustment of such a speed varying transmission, such means being of a character cheaply produced, easily installed and maintained, and efficient and accurate in operation and manipulation.

The accompanying drawings illustrate my invention.

Fig. 1 is a side elevation of a Reeves transmission equipped with my present improvement; Fig. 2 a plan; Fig. 3 a fragmentary side elevation of my present improvement; Fig. 4 a section on line 4—4 of Fig. 3; Fig. 5 a section on line 5—5 of Fig. 3; Fig. 6 a section on line 6—6 of Fig. 4, and Fig. 7 a section of a modification by means of which the shifting gear element may be shifted electrically.

In the drawings R indicates a Reeves speed varying transmission of well-known form, comprising a frame 10, a power-receiving shaft 11, a power-delivery shaft 12, a cone pair 13 on shaft 11, a cone pair 14 on shaft 12, a connecting belt 15, a pair of abutment levers 16, 16, serving as abutments for the cone pairs 13 and 14, a controlling shaft 17 having oppositely threaded portions 18, 18, and nuts 19, 19 mounted on the threaded portions 18, 18 of shaft 17 and engaging levers 16, 16, all of these parts being of common and well-known construction, and the arrangement being such that, by rotating shaft 17, levers 16, 16 may be swung so as to simultaneously shift the cones of the two pairs 13 and 14 in opposite directions so as to vary the relationship of said cone pairs to the belt 15 and thus vary the speed of shaft 12 relative to shaft 11.

Heretofore shaft 17 has been rotated either by means of a crank or by means of a sprocket wheel and sprocket chain depending therefrom to a point within reach of an operator.

In my present improvement I mount upon one of the shafts, 11 or 12, and preferably upon shaft 11 because its speed of rotation is constant, a pinion 20.

Journaled upon an extended end of shaft 17 is a gear carrier C upon which is journaled a gear train comprising gear 21, pinion 22 meshing with gear 21, pinion 23 meshing with gear 21 and pinion 24 meshing with pinion 23, the two pinions 22 and 24 being spaced apart a distance somewhat greater than the diameter of pinion 20 and being so located that either one of said pinions 22, 24 may be swung to mesh with pinion 20. Journaled upon the extended end of shaft 17, and frictionally associated with said shaft, is a gear 25 which meshes with gear 21. Any suitable yielding connection between gear 25 and shaft 17 may be provided, in the present instance said connection comprising a friction disk 26 secured to shaft 17 and friction disk 27 splined upon said shaft, a spring 28 acting upon disk 27, and nuts 29 mounted upon shaft 17 and forming an abutment for spring 28, gear 25 lying between the two friction disks 26 and 27.

Carrier C is normally balanced in a medial position where gears 22 and 24 are both held out of mesh of gear 20 by two springs 30, 30 abutting upon carrier C in opposite directions and upon a stud 31 carried by the main frame.

Pivoted upon stud 31 is an operating lever 32 provided with an arm 33 connected by a link 34 with carrier C, the arrangement being such that by swinging lever 32 in one direction or the other, either pinion 22 or pinion 24 may be thrown into mesh with pinion 20 and retained in mesh so long as the lever 32 is held in its shifted position.

Many suitable means may be provided for shifting the carrier C. For instance, in Fig. 1, lever 32 is utilized for this purpose and manipulating members S and F are connected by wires 40 and 41 and bell crank levers 42 and 43, respectively, with the opposite ends of lever 32.

In Fig. 7 I show electrical means for shifting carrier C. For this purpose I attach to carrier C a supplemental bracket 50 which may be connected by links 51 and 52 with electromagnet armatures 53 and 54, respectively, arranged in the fields of electromagnets 55 and 56, respectively, the circuits 57 and 58 of said magnets having switches 59 and 60, respectively, located at any desired point, or points, so that, upon energization of one or the other of said magnets, carrier C will be shifted to bring pinion 22 or pinion 24 into mesh with pinion 20.

It can be readily understood that when one or the other of the pinions 22, 24 is brought into mesh with pinion 20, rotation of said pinion 20 will produce rotation of gear 25 and consequent rotation of shaft 17 so that nuts 19 will be shifted and consequently levers 16 will be shifted to adjust the cone pairs. It will also be understood that whenever too great a resistance to turning of shaft 17 is offered, as, for instance, by an attempt to carry levers 16 beyond their normal range of movement, the frictional connection between gear 25 and shaft 17 will yield and thus damage will be prevented.

It is desirable to insure against possibility of an abnormal movement of levers 16, due to the operator carelessly maintaining mesh between pinion 20 and one or the other of pinions 22, 24 and for this purpose I provide a floating rod 70 (Fig. 2) which is extended loosely through the two nuts 19, 19. Upon rod 70 I mount two pairs of collars 71 readily held in any desired position of adjustment by set screws 72 (Fig. 4), a collar 71 being placed upon each side of each nut 19. By properly adjusting the collars 71, two of said collars will provide limitations for outward movement of nuts 19 and the other two of said collars will provide limitation for inward movement of said nuts and, as the two nuts will be acting in opposition to each other upon rod 18, said rod does not need to be anchored in any way upon the frame. It will also be apparent that whenever nuts 19 contact with collars 71, sufficient resistance to further turning of shaft 17 will be provided to cause gear 25 to slip between flanges 27 so that there can be no jambing of the nuts 19 on the threads 18.

It is quite desirable that the operator at the distant point be advised as to the relation of the parts of the speed varying transmission and a convenient indicator for this purpose may be provided by a line of cable 80, bell crank levers 81 and supports 82, cable 83, indicator 84 and chart 85, the indicator 84 and chart 85 being located at a point of convenient observation.

I have found in practice that pinions 22 and 24 may be easily meshed and demeshed from pinion 20 while said pinion 20 is rotating under normal conditions, the frictional connection between gear 25 and shaft 17 readily absorbing the shock. I have also found that by means of the mechanism described, it is possible to accurately adjust the speed changing transmission from any distant point without the possibility of injury to the mechanism, so that the operator of any machine driven by the mechanism may continuously keep such machine at its most efficient speed.

I claim as my invention:

1. The combination with a speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, of friction means for rotating said threaded shaft, and adjustable means cooperating with said nuts for limiting the movement thereof, said means comprising a floating rod associated with the nuts, and adjustable elements on said rod cooperating with the nuts in opposite directions relative to the rod.

2. The combination with a speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, of a gear connected to the shaft of one pair of cones, and a train of gears between said gear and the threaded shaft, said train of gears comprising means by which the threaded shaft may be driven in either direction and also comprising a frictional connection between the driving element of said train and the threaded shaft.

3. The combination with a speed varying mechanism comprising two pairs of friction cones, a connecting belt, two controlling levers acting upon said pairs of cones to variably position the same relative to the belt, a threaded shaft and a pair of nuts carried by said shaft and engaging said levers to variably position the same, of a reversible driving gear train between one of the cone pairs and the threaded shaft, said driving train including a shock absorbing element between the driving element thereof and the threaded shaft, and means by which the connection between said driving train may be reversed from a distant point.

4. The combination with a speed varying mechanism comprising two pairs of friction cones, a connecting belt, two controlling levers acting upon said pairs of cones to variably position the same relative to the belt, a threaded shaft and a pair of nuts carried by said shaft and engaging said levers to variably position the same, of a reversible driving gear train between one of the shaft cone pairs and the threaded shaft, said driving train including a shock absorbing element between the driving element thereof and the threaded shaft and means by which the connection between said driving train may be reversed from a distant point.

5. The combination with a speed varying mechanism comprising two pairs of friction cones, a connecting belt, two controlling levers acting upon said pairs of cones to variably position the same relative to the belt, a threaded shaft, and a pair of nuts carried by said shaft and carried by said levers to variably position the same, a gear connected to the threaded shaft, a gear connected to a cone pair, a gear-carrier journaled upon the axis of the first mentioned gear, a gear carried by said carrier and meshing with said first mentioned gear, a pair of pinions carried by the carrier and associable one or the other with the second mentioned gear and connected with the third mentioned gear in such manner as to rotate the same in either direction, means for normally holding the carrier in yielding position with the two pinions out of mesh with the second mentioned gear, and means by which said carrier may be shifted in opposite directions from its neutral position from a distant point to mesh one or the other of said pinions with the gear connected to a cone pair.

6. The combination with a speed varying mechanism comprising two pairs of friction cones, a connecting belt, two controlling levers acting upon said pairs of cones to variably position the same relative to the belt, a threaded shaft, and a pair of nuts carried by said shaft and carried by said levers to variably position the same, a gear connected to the threaded shaft, a gear connected to a cone pair, a gear-carrier journaled upon the axis of the first mentioned gear, a gear carried by said carrier and meshing with said first mentioned gear, a pair of pinions carried by the carrier and associable one or the other with the second mentioned gear and connected with the third mentioned gear in such manner as to rotate the same in either direction, means for normally holding the carrier in yielding position with the two pinions out of mesh with the second mentioned gear, a frictional connection between one of said gears and the element driven thereby, and means by which said carrier may be shifted in opposite directions from its neutral position from a distant point to mesh one or the other of said pinions with the gear connected to a cone pair.

In witness whereof, I have hereunto set my hand at Indianapolis, Indiana, this 18 day of May, A. D. one thousand nine hundred and twenty five.

MILTON O. REEVES.